Jan. 11, 1955
H. L. TURNER ET AL
2,699,305
AIRCRAFT CANOPY ESCAPE CAPSULE
Filed June 14, 1951
4 Sheets-Sheet 1
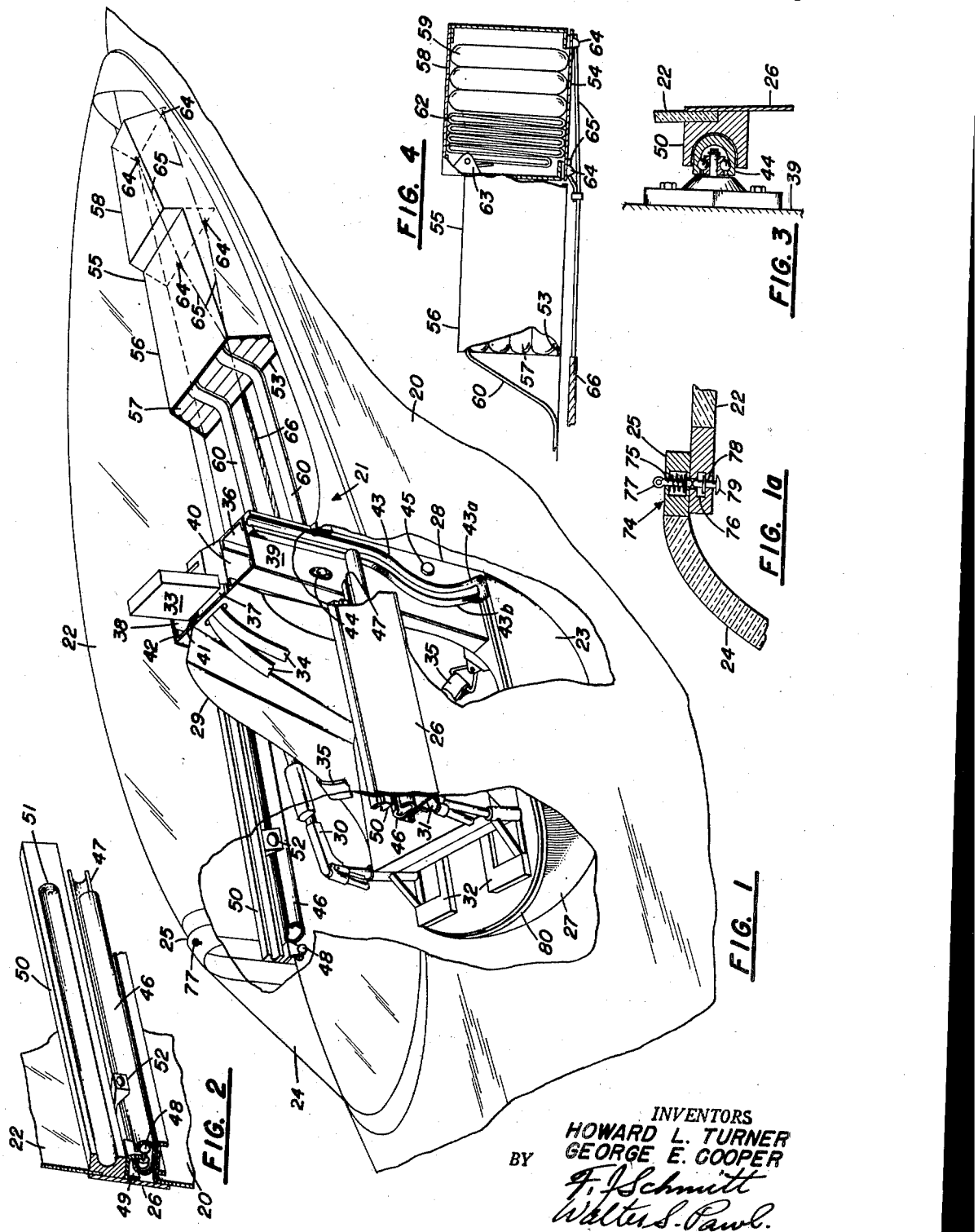
INVENTORS
HOWARD L. TURNER
GEORGE E. COOPER
BY
F. J. Schmitt
Walter S. Pawl.
ATTORNEYS

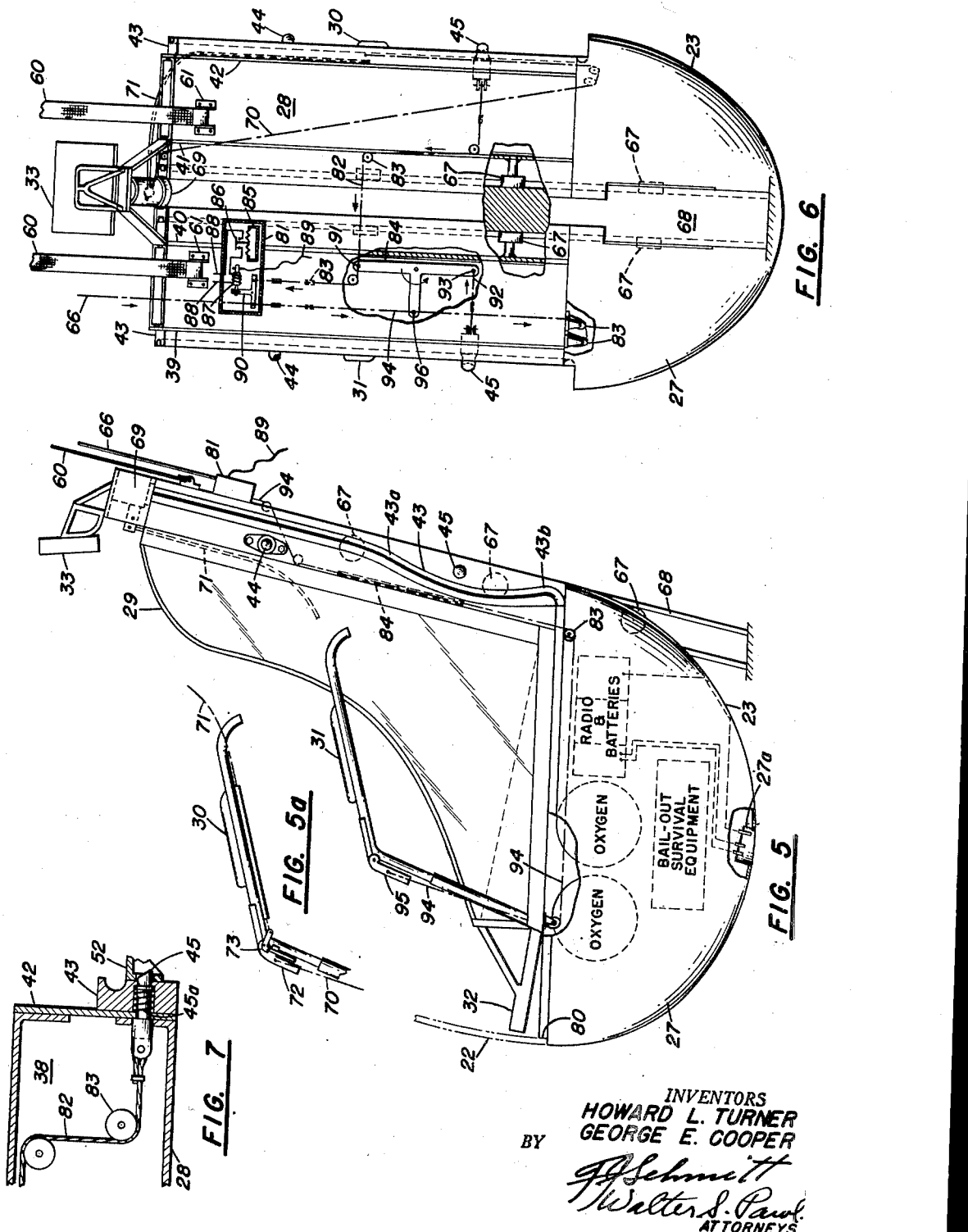

Jan. 11, 1955

H. L. TURNER ET AL 2,699,305

AIRCRAFT CANOPY ESCAPE CAPSULE

Filed June 14, 1951

INVENTORS
HOWARD L. TURNER
BY GEORGE E. COOPER

*Schmitt*
*Walter S. Pauli*
ATTORNEYS

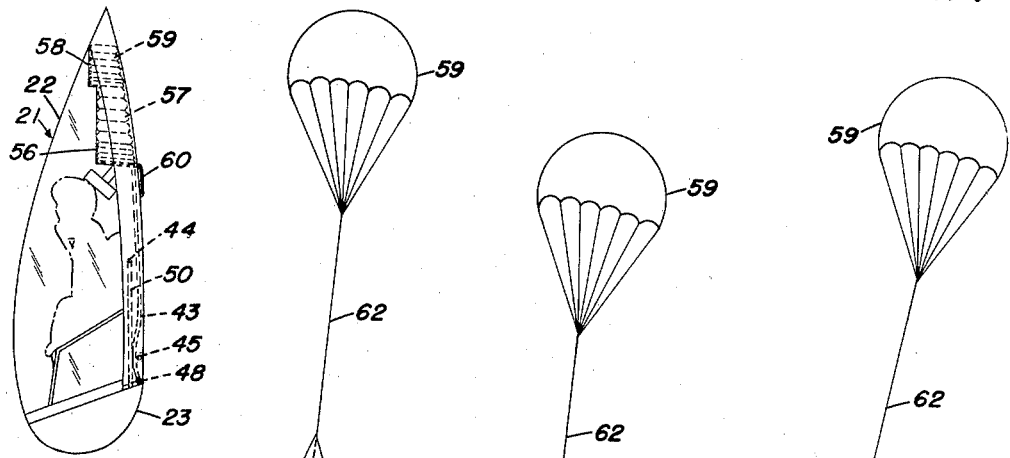
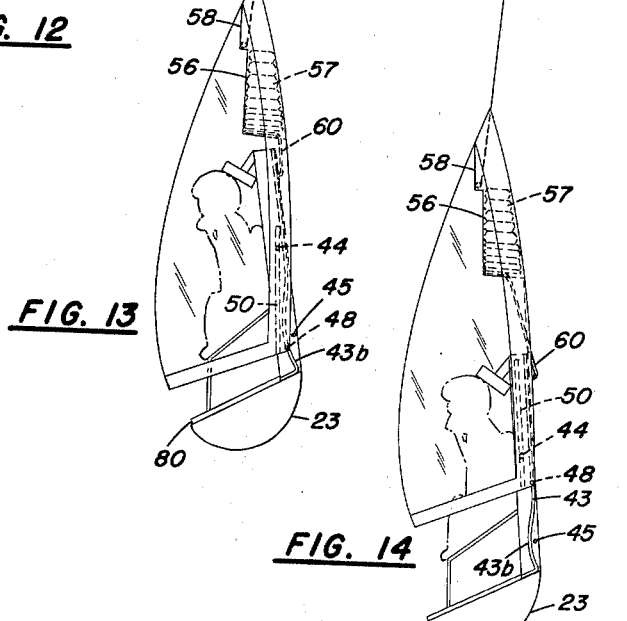
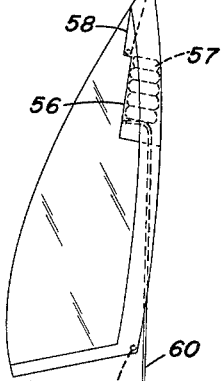
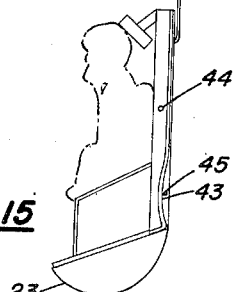
FIG. 12
FIG. 13
FIG. 14
FIG. 15
INVENTORS
HOWARD L. TURNER
GEORGE E. COOPER
ATTORNEYS

United States Patent Office 2,699,305
Patented Jan. 11, 1955

2,699,305

AIRCRAFT CANOPY ESCAPE CAPSULE

Howard L. Turner, Mountain View, and George E. Cooper, Saratoga, Calif.

Application June 14, 1951, Serial No. 231,644

29 Claims. (Cl. 244—141)

(Granted under Title 35, U. S. Code (1952), sec. 266)

The present invention relates to an aircraft canopy escape capsule and more particularly to an aircraft escape capsule in which the canopy and pilot's seat coact to provide an emergency escape means for the pilot during flight. This invention is particularly useful in high speed and/or high altitude aircraft.

Related prior art discloses several types of emergency escape devices for aircraft personnel, among which are the cabin parachute type wherein the cabin is detached from the aircraft by an attached releasable parachute, and the simple seat ejection type wherein the pilot and seat are propelled upwardly away from the aircraft. The former type is obviously highly disadvantageous in high speed aircraft since fouling of the parachute on the tail section and jamming of the cabin bearing surfaces is prevalent during high speed operation. Further, many quick-disconnects are required for the controls, instruments, etc. which increase the bail-out preparation time.

The simple ejection seat is the most nearly comparable apparatus in present use today. However, the seat provides nothing in the way of protection for the pilot from injury by the elements of nature. The following are some of the numerous objections to the presently known ejection seat:

*a.* Poor aerodynamic shape and questionable stability which normally leads to large deceleration values and large tumbling acceleration during ejections at high speeds.

*b.* No protection for the pilot from the severe forces of the airstream upon ejection of the seat unless, as in some cases, a canvas curtain is provided which is held over the face of the pilot by his hands. Further, these airstream forces tend to rip off the pilot's oxygen mask since no means is provided to prevent such a force against the mask.

*c.* No protection is provided for the low temperatures encountered at high altitudes.

*d.* Present use of the ejection seat requires that the cockpit canopy be jettisoned and past experience has proven that the path of the jettisoned canopy is unpredictable and unless certain precautions are followed the canopy may inflict fatal injuries to the pilot.

*e.* The sequence of events prior to an ejected escape are complicated and take valuable time which may mean the difference between a successful or unsuccessful escape. Further, acceleration forces may be such as to make it impossible for the pilot to complete the required preparations prior to the ejection even though the pilot is uninjured.

No satisfactory method is now in use that would insure the safe escape of the pilot whether injured or uninjured.

According to this invention, the above mentioned disadvantages are avoided as will be hereinafter more specifically described. Briefly, the canopy escape capsule consists of a specifically designed ejection seat and cockpit enclosure or canopy. The base of the seat contains survival equipment such as a radio and batteries, oxygen and conventional bail-out apparatus, and the seat is ejected by conventional propulsion means. The canopy is secured to the seat by pivot bearings which move in a vertical plane and the forward end of the canopy is guided by bearings restrained by a guide rail whereby, upon ejection, the canopy and seat close like a clam shell and lock to form a semi-teardrop body completely encasing the pilot. After ejection, a drogue chute automatically detaches itself from the capsule upon the latter reaching a predetermined altitude whereupon the canopy, to which the drogue chute is attached, is disconnected from the seat and floats free allowing the seat and pilot to safely descend by means of a main chute attached to the seat and originally contained within the capsule. The pilot may either ride the seat to the ground or detach himself therefrom and use his personal parachute.

The above described structure provides an enclosure for the pilot which prevents deleterious forces of nature to act upon the pilot from the time he is ejected until he reaches a safe altitude. During extremely high altitudes, the pilot has use of the survival equipment carried in the seat and is protected from extreme low temperatures and rarified air conditions.

An object of the present invention is to provide an escape capsule for aircraft which may be ejected during flight.

Another object is to provide an escape capsule which prevents undue forces upon the pilot resulting from severe accelerations and decelerations and provides low temperature and rarified air protection.

Another object is to provide survival equipment means for the pilot during his descent to the ground.

Another object is to provide an escape capsule which will cause no injury to the pilot upon ejection of the capsule.

Another object is to provide a means of escape for the pilot which is neither complicated nor time consuming.

Other objects and advantages will be apparent upon consideration of the following specification, claims, and drawing in which:

Fig. 1 is a perspective view of the canopy escape capsule as mounted on the aircraft;

Fig. 1a shows an enlarged view of the canopy latch.

Fig. 2 is a perspective view, partly in section, showing the assembly of the pivot bearing guide, canopy guide rail, and canopy bearing;

Fig. 3 shows the seat pivot bearing and guide assembly, partly in section;

Fig. 4 shows a side elevation, partly in section, of the main and drogue chutes as assembled;

Fig. 5 show a left side elevation of the seat;

Fig. 5a shows a fragmentary view of the right arm rest of the seat;

Fig. 6 shows a rear elevation of the seat with parts in section and parts broken away;

Fig. 7 shows the capsule latch and socket mechanism;

Figs. 8–11 illustrate the sequence of events in the ejection cycle for the capsule and Figs. 12–15 illustrate the sequence of events in the descending cycle for the capsule.

Figure 8:
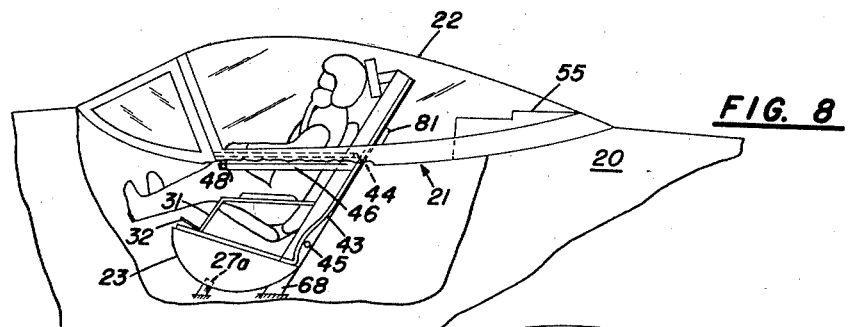

Referring to Figure 1, the aircraft 20 comprises an escape capsule 21 composed of a rearwardly movable bubble canopy or enclosure 22 and ejection type seat 23. The fixed windshield 24 completes the cockpit or cabin enclosure and has at its rearward edge a flange 25 which overlaps canopy 22 to provide a sealing means when the canopy is in the closed position. Flange 26 forms a part of the canopy and overlaps the fuselage to provide side sealing means for the canopy for purposes of cockpit pressurization if such is desired.

The seat 23 comprises a curved base 27, back 28, pilot's seat portion 29, arm rests 30 and 31, foot rests 32, and head rest 33. The usual shoulder harness 34 and safety belt 35 are attached to the seat portion 29 in the conventional manner. Back 28 is constructed of structural metal members forming three compartments 36, 37, and 38, having side walls 39, 40, 41, and 42. Side walls 39 and 42 each carries a canopy bearing guide 43 having a channel 43a and a lower cam portion 43b, a seat pivot bearing 44, and a capsule latch 45. Base 27 contains survival equipment such as oxygen, radio and batteries, and conventional bail-out survival equipment. An electric quick-disconnect plug 27a is located at the bottom of the base 27 for disconnecting the aircraft generator from the radio and batteries upon ejection of the seat. This plug requires no attention from the pilot since the ejection of the seat properly breaks the connection. By locating the oxygen and battery supply in the seat, the usual disconnect plugs are eliminated for this equipment and the pilot has the constant use of oxygen for breathing and suit pressurization and battery source for suit heating throughout the ejection cycle.

U-shaped canopy guide rails 46 (Figs. 1 and 2) having cut-out portions 47 at their rearward ends are immovably mounted on each side of the cockpit providing bearing and supporting means for the double canopy bearings 48 (only one shown) which are in turn connected to the lower edge of the canopy by means of angle members 49 (only one shown). Seat pivot bearing guides 50 are connected to the lower edge of the canopy and overlie members 49 as can be best seen in Fig. 2. Seat pivot bearings 44 ride in the guides 50 (Fig. 3) and are located at the rearmost extremities 51 of the guides 50 when the canopy is in the closed position. Canopy latch sockets 52 (only one shown) mate with the latches 45 as shown in Fig. 7 when the capsule is formed during ejection. The seat latches 45 extend through their respective walls 39 and 42 and bearing guides 43. Referring particularly to Fig. 7, latch 45 is movable inwardly against the tension of spring 45a when the latch socket 52 engages latch 45.

Referring to Figs. 1 and 4, the rear portion of canopy 22 includes a base member 53 having a rearwardly disposed detached plate 54. The base member 53 supports an attached sectionalized parachute housing or container 55 providing a forward compartment 56 containing the main chute 57 and an aft compartment 58 located over the plate 54 and containing the drogue chute 59. The main chute shroud lines 60 are attached to the seat by conventional clamps 61 (Fig. 6) and the drogue chute shroud line 62 is attached to the compartment 58 by securing means 63. Plate 54 has apertures through which cones 64 extend, the latter being attached to compartment 58 and having pins 65 insertable therethrough to position the plate in place. Upon actuation of control cable 66 to the left as viewed in Figs. 1 and 4, pins 65 are removed from cones 64 allowing the disengagement of plate 54 and the release of chute 59 from the canopy.

Figs. 5, 5a, and 6 show the seat supporting structure and seat ejection mechanism. As shown, seat 23 is supported by rollers 67 engaging the channels of an H-beam 68 structurally connected to the aircraft. Rollers 67 depend from their respective side walls 40 and 41 and ride freely within the channels of beam 68 when the seat is propelled upwardly during the ejection cycle. The seat ejection mechanism hereinafter described and shown is merely illustrative of a conventional type, the specific details of which do not constitute a part of the present invention. The catapult 69 contains the conventional piston, cylinder, and cartridge firing mechanism (not shown) having a seat arming cable 70 and seat firing cable 71 extending therefrom. The arming cable 70 is guided over pulleys and attached to the arming handle 72 on the arm rest 30 and the firing cable 71 extends to and is attached to the firing lever 73. When the pilot is in position to bail-out, he manipulates handle 72 and 73 which arms and fires the catapult 69 ejecting the seat upwardly.

During normal canopy operations, the pilot may enter and leave a closed cockpit by simply unlatching the canopy 22 from windshield 24 by actuating latch means 74 and moving the canopy rearwardly on double bearings 48 riding in rails 46 and on bearings 44 riding in guides 50. Latch means 74 comprises a downwardly spring biased bolt 75 engaging slot 76 when the canopy is closed. Bolt 75 is provided at its upper end with a ring member 77 which unlatches the canopy when pulled upwardly. A release rod 78 is positioned within the slot 76 and engages the bolt 75 to unlatch the canopy when the push button member 79 is pressed upwardly. The canopy 22 automatically unlatches during ejection as its top forward end moves downwardly away from the top of the windshield.

Figure 9:
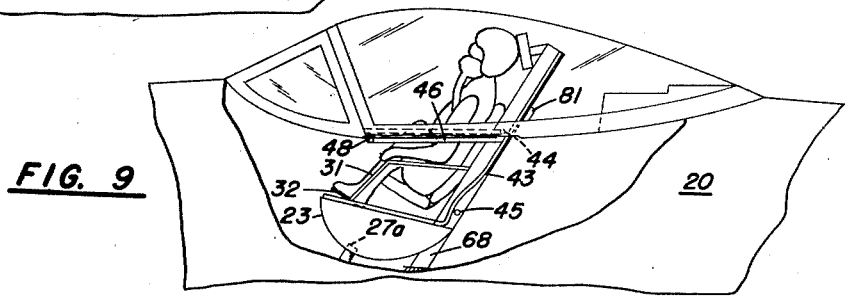
Figure 11:
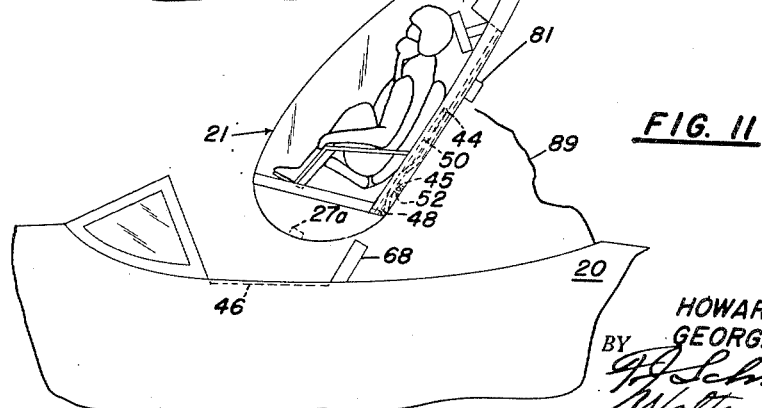

The capsule 21 is considered normally open in that for normal flight operations and for all cases where the seat and canopy retain the relationship as shown in Figs. 1, 8 and 9 of the drawings, the canopy escape capsule is open. The capsule is closed only during emergency conditions when the pilot is attempting to escape and the seat has emerged from the fuselage to the extent that the canopy has latched to the seat to form the capsule as illustrated in Fig. 11.

Figure 10:
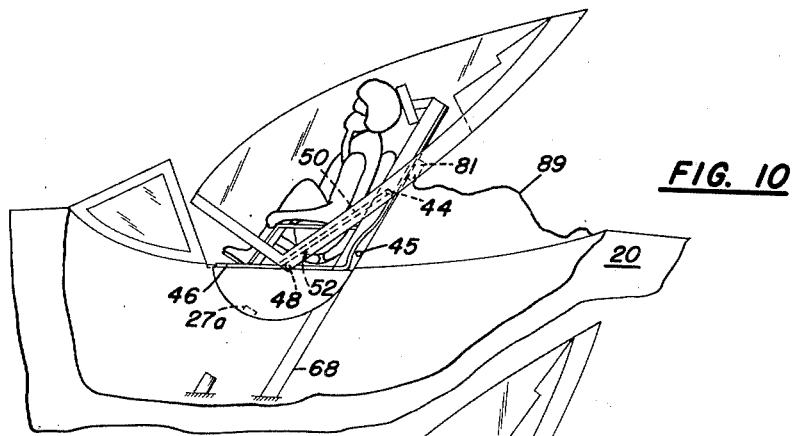

Fig. 8 shows the capsule 21 and pilot in the normal flight position. When the pilot desires to bail-out, he assumes the position shown in Fig. 9 wherein his arms and feet are placed on the arm rests 30 and 31 and foot rests 32, respectively. The arming and firing handles are lifted, whereupon, the seat 23 ascends on its rollers 67 within the channels of beam 68. As the seat ascends (Fig. 10), the canopy 22 pivots with respect to the seat about pivot bearings 44 contained within extremities 51 of guides 50 and the canopy is restrained at its forward end from moving in a vertical direction but directed rearwardly by double bearings 48 riding in rails 46. The ejection cycle continues until (see Fig. 11) the inner halves of bearings 48 simultaneously disengage rails 46 and engage channels 43a at the lower ends of cam portions 43b whereupon latches 45 enter sockets 52 locking the canopy to the seat to form the closed capsule 21 and preventing relative vertical movement between the seat and canopy. Vertical spacing of the bearings 44, bearings 48, and latches 45 prevent lateral displacement of the seat and canopy when the capsule is formed. Cut-out portions 47 permit clearance of the bearing guides 43 during ejection.

The sides and front of base 27 are recessed as at 80 (Figs. 1 and 5) to provide a bearing surface for the forward end of the canopy 22 whereby air is prevented from being scooped into the capsule 21. After the capsule 21 is formed, it disengages the beam 68 and clears all surfaces of the aircraft.

The disengagement of the canopy 22 from the seat 23 after the capsule 21 is formed is accomplished by one of two devices.

The first and automatic device for jettisoning the canopy employs an aneroid actuating mechanism comprising an aneroid switch 81 and dependent mechanism linkage 82, 83, and 84. Aneroid switch 81 comprises an evacuated pressure cell 85 responsive to altitude air pressure which actuates a micro-switch 86 interposed in the circuit to make or break the circuit to solenoid 87. Conductors 88 are suitably connected to the battery source. The solenoid 87 is armed by arming cable 89 connected to the aircraft 20 (Figs. 10 and 11) and operates associated bell crank 90 in a counter-clockwise direction. Referring to Figs. 5–7, cable 82, guided over pulleys 83, is connected at one end to bell crank 90, at the other end to the right hand latch 45, and intermediate the ends to bell crank 84 at point 91. Cable 92 connects the left hand latch 45 to crank 84 at point 93. Control cable 66 is connected to bell crank 90 as shown in Fig. 6.

When the capsule 21 clears the beam 68, the arming cable 89 is disconnected from solenoid 87 (Fig. 11) thus arming the solenoid for actuation of the crank 90 in a counter-clockwise direction when a pre-set altitude is reached to close switch 86. Upon closing of switch 86, the cables and cranks move in the direction shown by the arrows in Fig. 6 to unlatch the canopy by inward actuation of latches 45 and to simultaneously release the drogue chute 59 by pulling out pins 64 from cones 65 to jettison plate 54. Normally, but not necessarily, the pressure cell 85 will be pre-set for altitudes that range from 6000 to 10,000 ft. wherein the pilot does not generally require either oxygen, suit heat, or suit pressurization.

After the canopy is unlatched and the drogue chute is released, the seat is free to travel downwardly away from the canopy along guides 43 and 50 until the seat separates. Cam portion 43b prevents binding between the forward end of the canopy and recess 80 and provides positive clearance for this end of the canopy as is readily seen in Fig. 13. Separation of the seat pulls the main chute 57 by its shroud lines 60 from the forward compartment 56 (Fig. 15) whereupon the seat and pilot gradually descend to the ground. If the pilot so desires, he may unstrap himself from the seat and use his personal chute for descent to the ground.

The second and normally an emergency device for jettisoning the canopy is manually operated and comprises a cable 94 guided over pulleys 83 and connected at one end to crank 90, at the other end to an emergency release handle 95 pivoted on arm rest 31, and intermediate the ends to crank 84 at point 96. When handle 95 is lifted, bell cranks 84 and 90 pivot in the same manner explained in the automatic operation, producing the same results.

It may be noted that the parachute housing may be connected to the seat rather than to the canopy as shown. However, the former attachment still requires that the drogue chute shroud lines be connected to the canopy and may require the use of a deployment bag for the main chute (this function is served in the latter case by compartment 56) to aid in obtaining a lower opening shock of the main chute.

As is readily apparent from the illustrated and above described apparatus, the present invention relates to an escape means which is highly superior to presently known escape devices.

The semi-teardrop shape of the capsule with its forward center of gravity provides an aerodynamic body having inherent stability characteristics which reduce or eliminate accelerations due to tumbling. The streamlined form of the capsule presents less drag thereby reducing the magnitude of the decelerations of the ejected capsule.

Since the canopy completely shields the pilot during the complete ejection cycle, the pilot is not subjected to the forces of the airstream thereby eliminating the loss of personal clothing and equipment which in turn prevents possible injury to the pilot due to exposure or lack of oxygen. The provision of survival equipment in the capsule furnishes the pilot with the necessary oxygen, suit pressurization, and suit heat thereby providing continuous protection from extreme low temperatures, low pressures, and rarified atmospheres.

The capsule eliminates the dangerous process of jettisoning a canopy thereby reducing the time and operations necessary for the pilot's escape and increasing the safety of the escape procedure. Elimination of numerous quick-disconnects for controls, instruments, oxygen, radio and batteries, etc., decreases the time necessary to execute an ejection thereby simplifying the ejection preparations and necessary manual manipulations to provide an extremely speedy and safe escape means.

The canopy escape capsule as heretofore described is based on the use of a cockpit canopy as the enclosing half of the capsule. However, other types of enclosures such as a section of the aircraft fuselage readily performs the same function as a canopy in the case, for example, when a capsule is designed for members of the crew other than the pilot.

Various modifications or alternations may obviously be resorted to by those skilled in the art without departing from the spirit and scope of the invention as set forth in the appended claims.

The invention described herein may be manufactured and used by or for the Government of the United States of America for governmental purposes without the payment of any royalties thereon or therefor.

What we claim is:

1. In an aircraft having a fuselage, a normally open escape capsule located in said fuselage and comprising a seat and an enclosure, said seat being mounted in said fuselage for upward movement therefrom, said enclosure normally being located over said seat and pivotally mounted on said seat and fuselage for movement relative to the seat and fuselage, means for ejecting the seat upwardly in a vertical plane, and means operatively associated with said capsule and fuselage and responsive to said upward movement of said seat for displacing said enclosure to a position with respect to said seat to form a closed escape capsule.

2. In an aircraft having a fuselage, a normally open escape capsule located in said fuselage and comprising a seat and an enclosure, said seat being mounted in said fuselage for outward movement therefrom, said enclosure normally being located over said seat and having first pivot means pivoting said enclosure relative to said seat, second pivot means pivoting said enclosure relative to said fuselage, means for ejecting the seat outwardly away from said fuselage, and said first and second pivot means operatively associated with said capsule and fuselage and responsive to said outward movement of said seat for displacing said enclosure with respect to said seat to form a closed escape capsule.

3. In an aircraft having a fuselage, a normally open escape capsule located in said fuselage and comprising a seat and an enclosure, said seat comprising a curved base and being mounted in said fuselage for outward movement therefrom, said enclosure normally being located over said seat and having a curved shell-like outer surface, said enclosure being pivotally mounted on said seat for movement relative thereto, means for ejecting the seat outwardly away from said fuselage, and means operatively associated with said capsule and fuselage and responsive to said outward movement of said seat for displacing the enclosure to a position with respect to said seat to form a closed streamlined escape capsule.

4. In an aircraft having a fuselage, an attachment in said fuselage which constitutes a seat and canopy of the aircraft under normal flight conditions and an escape capsule under emergency flight conditions, means to eject said seat outwardly from said fuselage, and means operatively associated with said attachment and fuselage and responsive to the outward movement of said seat for displacing said canopy with respect to said seat and fuselage to form with said seat the escape capsule.

5. In an aircraft having a fuselage, an attachment in said fuselage which constitutes a seat and canopy of the aircraft under normal flight conditions and an escape capsule under emergency flight conditions, said seat comprising a curved base, said canopy having a curved shell-like outer surface, means to eject said seat outwardly from said fuselage, and means operatively associated with said attachment and fuselage and responsive to the outward movement of said seat for displacing said canopy with respect to said seat and fuselage to provide with said seat a streamlined escape capsule.

6. The combination of claim 1 further defined by releasable latch means retaining said enclosure secured to said seat when the closed escape capsule is formed.

7. The combination of claim 2 further defined by releasable latch means retaining said enclosure secured to said seat when the closed escape capsule is formed.

8. The combination of claim 3 further defined by releasable latch means retaining said enclosure secured to said seat when the closed streamlined escape capsule is formed.

9. The combination of claim 4 further defined by releasable latch means maintaining said capsule closed, and unlatching means separating the seat from the canopy after the capsule is formed.

10. In an aircraft having a fuselage, an attachment in said fuselage which constitutes a seat and canopy of the aircraft under normal flight conditions and an escape capsule under emergency flight conditions, said seat comprising a curved base, said canopy having a curved shell-like outer surface, means to eject said seat outwardly from said fuselage, means operatively associated with said attachment and fuselage and responsive to the outward movement of said seat for displacing said canopy against the front of said seat in enclosing relationship therewith to provide a streamlined escape capsule, and latch means provided on said seat and canopy for engagement when said capsule is formed.

11. In an aircraft having a fuselage, an attachment in said fuselage which constitutes a seat and canopy under normal flight conditions and an escape capsule under emergency flight conditions, said seat having a straight back portion and a base portion of an ellipsoidal segment, said canopy being concavo-convex, means to eject said seat outwardly from said fuselage, and means operatively associated with said attachment and fuselage and responsive to the outward movement of said seat for displacing said canopy against the front of said seat in enclosing relationship therewith to form a semi-teardrop shaped escape capsule.

12. In an aircraft having a fuselage, said fuselage having an opening covered by an enclosure, a seat located in the fuselage and surrounded by said opening, bearings mounted on opposite sides of said enclosure and pivotally and movably associated within parallel rails mounted substantially transverse of and on opposite sides of said opening, means to eject said seat outwardly through said opening, pivotal means attached to said enclosure and seat for pivotal movement of said enclosure with respect to said seat, said enclosure pivoting relative to said seat on said pivotal means and pivoting and moving with respect to said fuselage within said rails as the seat is ejected, said enclosure being displaced against said seat to form an escape capsule.

13. The combination of claim 10 further defined by unlatching means separating the seat from the canopy after the capsule is closed.

14. The combination of claim 11 further defined by latching means maintaining the capsule closed, and unlatching means separating the seat from the canopy after the capsule is formed.

15. The combination of claim 14, wherein the last mentioned means includes air pressure responsive means.

16. The combination of claim 14, wherein the last mentioned means includes manual release means.

17. The combination of claim 12 further defined by latching means maintaining the capsule closed, and means operatively associated with said capsule and including air pressure responsive means for separating the seat from the enclosure after the capsule is formed.

18. In an aircraft having a fuselage, said fuselage comprising a seat and an enclosure, means to eject said seat and enclosure, means operatively combining said seat and enclosure upon ejection to form an escape capsule, said last mentioned means including securing means to maintain said capsule closed, said capsule having a parachute housing containing a drogue chute and main chute, said drogue chute being attached to said enclosure and said main chute being attached to said seat, and release means connected to said securing means and operatively associated with said drogue chute to simultaneously release said securing means and drogue chute to separate the seat from the enclosure.

19. In an aircraft having a fuselage, said fuselage comprising a seat and an enclosure, means to eject said seat and enclosure, means operatively combining said seat and enclosure upon ejection to form an escape capsule, said last mentioned means including securing means to maintain said capsule closed, said capsule having a parachute housing containing a drogue chute and main chute, said drogue chute being attached to said enclosure and said main chute being attached to said seat, an actuator connected to said securing means and operatively associated with said drogue chute, a control device including an operator responsive to air pressure and a manual operator, and both said operators connected to said actuator for independent movement of the latter in a direction to simultaneously release said securing means and drogue chute, separating the seat from the enclosure.

20. The combination of claim 18, wherein said release means comprises a pre-set aneroid switch responsive to air pressure.

21. The combination of claim 18, wherein said release means comprises a manual operating means and related mechanical linkage, and said manual operating means being located within the capsule within accessibility of the crew member.

22. The combination of claim 4 further defined by said seat having a base portion provided with means to contain equipment therein.

23. In an aircraft having a fuselage, said fuselage having an opening covered by a concavo-convex enclosure, a seat having a base portion of an ellipsoidal segment being located in the fuselage and surrounded by said opening, said enclosure being pivoted intermediate its ends to said seat, means operatively associated with said enclosure, seat, and fuselage, and to eject said seat, means responsive to the ejection of said seat for pivoting said enclosure against the front of said seat to form a semi-teardrop shaped escape capsule, the rear portion of said enclosure being positioned above the back of said seat when said capsule is formed and having a parachute housing therein, said housing containing a drogue chute attached to said enclosure and a main chute attached to said seat, securing means maintaining said capsule closed, and unlatching means disengaging said securing means and releasing said drogue chute.

24. An escape capsule adapted to be ejected from an aircraft and having a semi-teardrop shape, said capsule comprising a seat and an enclosure, said seat having a back and a base constituting, respectively, a portion of the back and bottom parts of the capsule, said enclosure constituting the front and sides of the capsule, a parachute housing having a wall and attached within the enclosure above said seat, said wall constituting the other back portion of the capsule, unlatching means securing said seat to said enclosure, and latching means disengaging said last mentioned means, separating said seat from said capsule.

25. The combination of claim 24, wherein said housing contains a drogue chute having its shroud line attached to the housing and a main chute having its shroud line attached to said seat, and said means for disengaging said last mentioned means including means to release said drogue chute from said housing.

26. An escape capsule adapted to be ejected from an aircraft and having a semi-teardrop shape, said capsule comprising a seat and an enclosure, said seat having a back and a base constituting, respectively, a portion of the back and bottom parts of the capsule, said enclosure constituting the front and sides of the capsule, a parachute housing having a wall and attached within the enclosure above said seat, said wall constituting the other back portion of the capsule, said housing containing a drogue chute having its shroud line attached to the housing and a main chute having its shroud line attached to said seat, said wall comprising a detachable plate positioned under said drogue chute, latch means securing said seat to said enclosure, and unlatching means disengaging said last mentioned means and for detaching said plate to release said drogue chute, separating the seat from the enclosure.

27. An escape capsule adapted to be ejected from an aircraft, said capsule comprising a seat enclosed at its front portion by an enclosure, said enclosure being slidably engaged with said seat, releasable latch means securing said enclosure to said seat, a main chute and a drogue chute positioned within said enclosure, said main chute being attached by its shroud lines to said seat for movement therewith, said drogue chute being attached to said canopy by its shroud line, and means unlatching said latch means and releasing said drogue chute whereby said seat and main chute are slidably detached from said enclosure.

28. The combination of claim 27, wherein said unlatching means comprises an aneroid switch responsive to air pressure connected to said latch means and operatively associated with said drogue chute by linkage means, and said switch being armed by means adapted for connection to the aircraft.

29. The combination of claim 27, wherein said unlatching means comprises a manually operated lever positioned on said seat within easy reach of a crew member, and said lever being connected to said latch means and operatively associated with said drogue chute by mechanical linkage.

References Cited in the file of this patent

UNITED STATES PATENTS

| | | |
|---|---|---|
| 1,626,796 | Drabenstott | May 3, 1927 |
| 1,760,061 | Horni | May 27, 1930 |
| 1,820,958 | Zinkowetsky | Sept. 1, 1931 |
| 2,120,477 | Adams | June 14, 1938 |
| 2,446,609 | Reed | Aug. 10, 1948 |
| 2,494,207 | Sabbia | Jan. 10, 1950 |
| 2,502,470 | Martin | Apr. 4, 1950 |
| 2,621,875 | Darling | Dec. 16, 1952 |

FOREIGN PATENTS

| | | |
|---|---|---|
| 829,331 | France | Mar. 28, 1938 |
| 711,045 | Germany | Sept. 25, 1941 |

OTHER REFERENCES

Time Magazine, page 70, November 1, 1948.
Aviation Week Magazine, page 28, April 3, 1950.